Feb. 3, 1970     L. B. NILSEN ET AL     3,493,137
PALLET CLAMPING DEVICE
Filed June 13, 1968     3 Sheets-Sheet 1
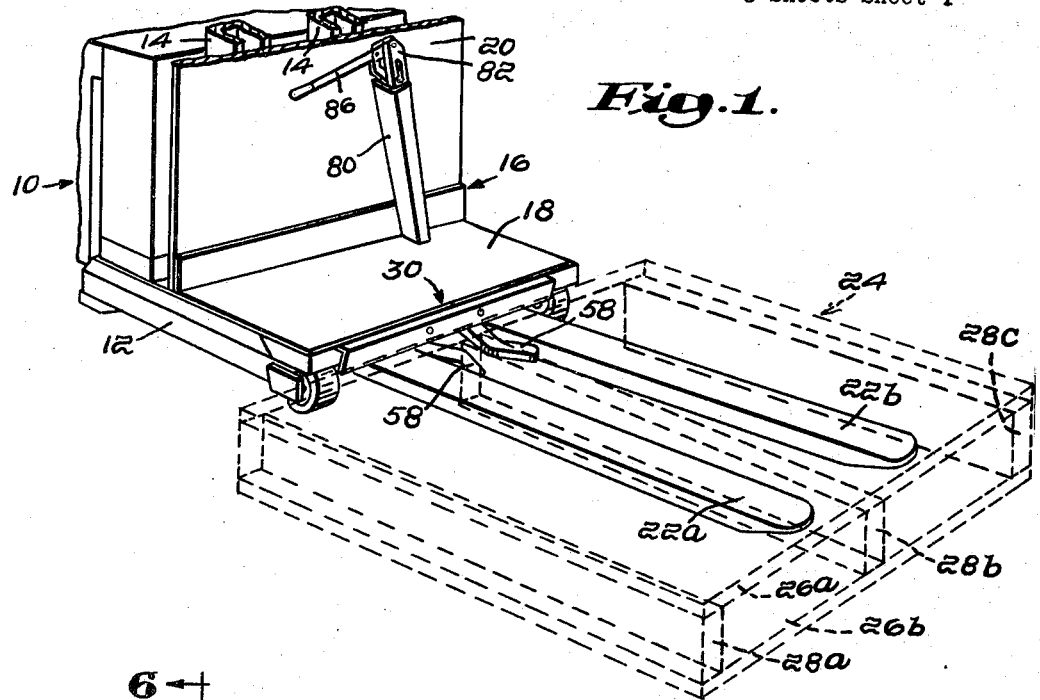

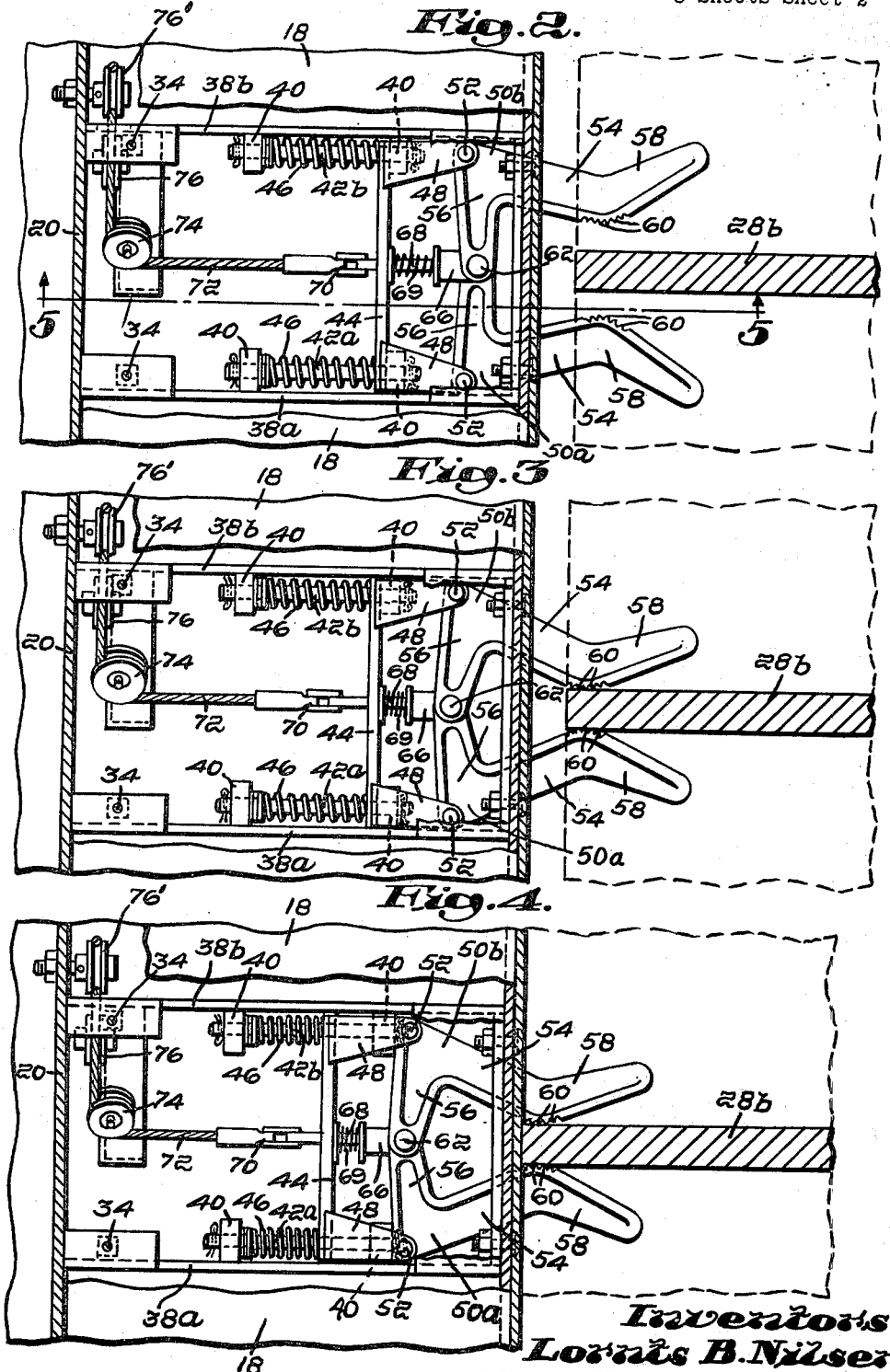

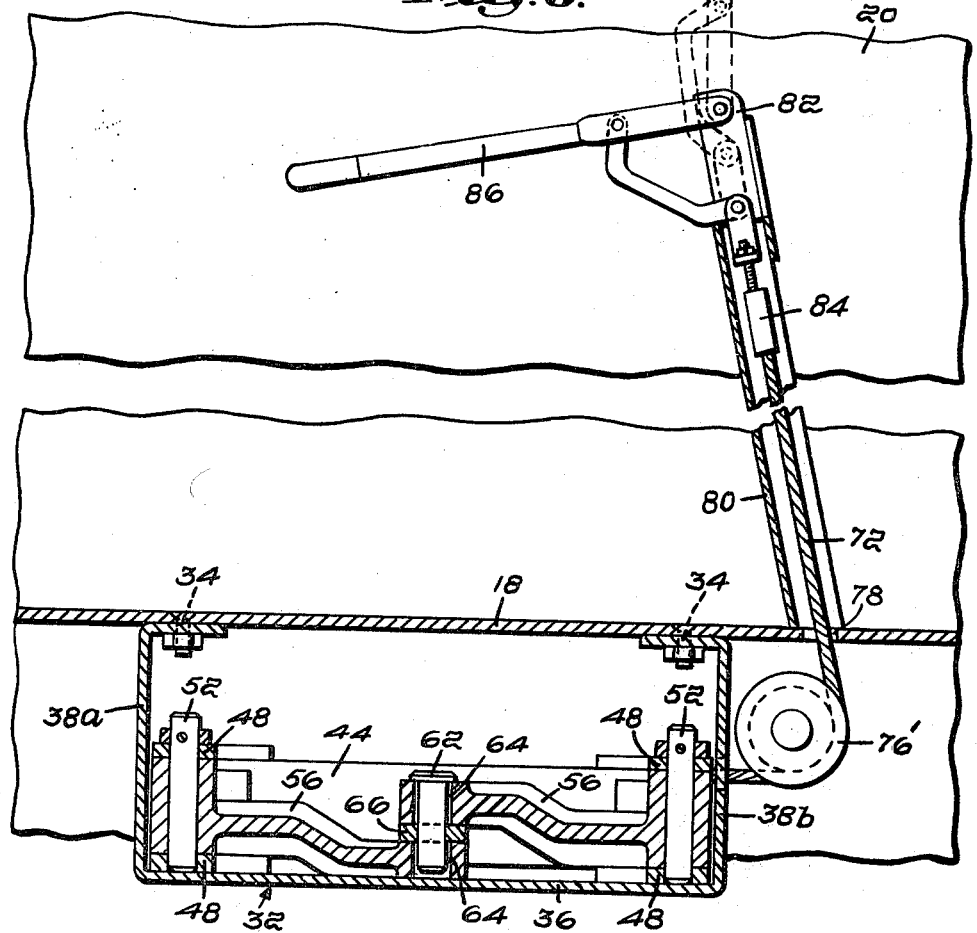
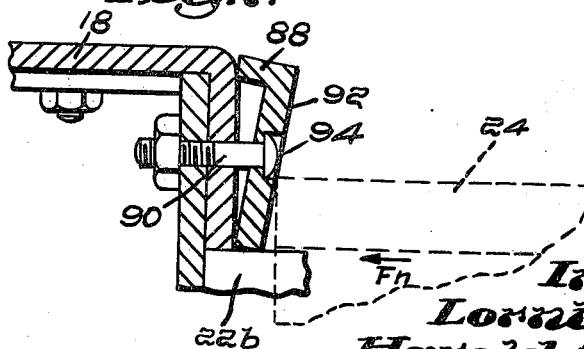

ated Feb. 3, 1970

United States Patent Office 3,493,137
Patented Feb. 3, 1970

3,493,137
PALLET CLAMPING DEVICE
Lornts B. Nilsen, West Gloucester, and Harold C. Bennett, Watertown, Mass., and Gerald F. Russes, La Canada, Calif., assignors to Lewis-Shepard Company, Watertown, Mass., a corporation of Massachusetts
Filed June 13, 1968, Ser. No. 736,802
Int. Cl. B66f 9/12; B60p 1/64
U.S. Cl. 214—621          11 Claims

ABSTRACT OF THE DISCLOSURE

An apparatus for clamping and rigidly securing a support platform, such as for example a pallet, in place on the adjustable and/or spaced load carrying forks of a material handling truck. The apparatus includes a pair of clamping members movable relative to a fixed bearing surface on the truck. Following insertion of the load forks beneath the support platform, the clamping members positively grip the support platform and pull it against the fixed bearing surface. The bearing surface is preferably inclined from the vertical so as to create a downward resultant force tending to press the support platform onto the load engaging forks.

DESCRIPTION OF THE INVENTION

This invention relates generally to material handling equipment, and more particularly to an apparatus for clamping load supporting platforms, such as for example pallets, in place on the load engaging forks of a material handling truck.

It has heretofore been the practice when handling pallets and the like with fork lift trucks, to simply insert the forks beneath the pallets and to thereafter lift the pallets by raising the forks to the desired elevation.

A general object of the present invention is to provide means for stabilizing and securing pallets and the like on the load engaging forks of a material handling truck. In one embodiment of the invention to be hereinafter described in greater detail, this is accomplished by employing a pair of clamping jaws movable relative to a fixed bearing surface on the truck. The clamping jaws are positioned to axially receive a central support member on the pallet when the load forks are inserted therebeneath. An operating mechanism first clamps the jaws onto the pallet support member, and then moves the jaws toward the fixed bearing surface. This results in the pallet being held securely against the bearing surface until such time as the clamping jaws are subsequently released.

Another object of the present invention is to impart vertical stability to the pallet being carried on the load forks of the material handling truck. This is accomplished by pulling the pallet against a stationary bearing surface which is inclined from the vertical so as to impart a resultant force tending to push the pallet down onto the load forks.

A further object of the present invention is to provide a clamping device for securing pallets and the like on the load forks of a material handling truck, which device may be quickly and efficiently operated by a single conveniently positioned control lever. Additional objects include the provision of a pallet clamping device which is rugged in construction and simple to install on either new or existing equipment.

Other objects and advantages of the present invention will become more apparent as the description proceeds with the aid of the accompanying drawings in which:

FIG. 1 is a partial perspective view of a material handling truck employing one embodiment of the present invention;

FIGS. 2–4 are plan views with parts broken away illustrating the sequence of operation of the clamping device shown in FIG. 1;

FIG. 5 is a sectional view taken along line 5—5 of FIG. 2;

FIG. 6 is a sectional view taken along line 6—6 of FIG. 5; and

FIG. 7 is an enlarged view showing the edge of the pallet bearing against the fixed bearing surface.

Referring initially to FIG. 1, a material handling truck generally indicated by the reference numeral 10 is shown comprising a mobile chassis 12 with vertically disposed masts 14 extending upwardly therefrom. A carriage assembly 16 including a horizontal operator's platform 18 and back panel 20 is mounted in a conventional manner for vertical movement on the masts 14. A pair of spaced load engaging forks 22a and 22b extend forwardly from beneath the operator's platform 18 to provide a means of engaging and lifting support platforms, such as for example the pallet 24 herein shown in the drawings. Pallet 24 is of the conventional double faced type having upper and lower load bearing surfaces 26a and 26b spaced by a plurality of intermediate stringers 28a, 28b and 28c.

When lifting pallet 24, the lift forks 22a and 22b are initially inserted between upper and lower load bearing surfaces 26a and 26b, one fork being positioned on either side of the center stringer 28b. The carriage asembly 16, together with the load forks and pallet, is then raised slightly, the pallet clamped, and the truck thereafter moved to another location.

Both the material handling truck 10 and the pallet 24 are conventional pieces of apparatus commonly employed throughout the material handling industry. Their description has been provided only as an introductory basis upon which to proceed with a further detailed description of the clamping device 30 constituting a preferred embodiment of the present invention.

As can be best seen by further reference to the remaining drawings, the basic components of the clamping device 30 are contained within a housing 32 secured to the underside of carriage platform 18 by any convenient means such as for example bolts 34 (see FIGS. 2 to 6). Housing 32 includes a bottom 36 and side plates 38a and 38b, the latter supporting inwardly disposed brackets 40. Brackets 40 in turn support parallel guide rods 42a and 42b. A carriage plate 44 is slidably mounted on the guide rods 42a and 42b and urged towards the front of the truck by coiled springs 46. Carriage plate 44 is provided at either end with forwardly extending vertically spaced ears 58. Clamping members 50a and 50b are pivotally secured to the carriage plate by means of pins 52 extending vertically through the ears 48. Each clamping member is of a bell crank design forming a jaw section 54 with an angularly disposed lever arm 56. The jaw sections of each clamping member are turned outwardly as at 58 with their inner curved faces serrated as at 60.

As can be best seen in FIG. 6, the clamping members 50a and 50b are pivotally interconnected by means of a pivot pin 62 extending vertically through oversized holes 64 in the lever arms 56. Pivot pin 62 also extends through a connecting link 66 located between the lever arms 56. Link 66 is provided with a rod-like extension 68 which extends rearwardly through carriage plate 44 to be connected as at 70 to an operating cable 72. A spring 69 pushes link 66 away from carriage plate 44, thus urging the gripping members 50 to the open position.

Cable 72 extends from rod 68 around sheaves 74, 76 and 76', and then proceeds upwardly through an opening 78 in platform 18 into a post 80 which is secured to back panel 20. Post 80 supports an overcenter toggle lock 82 to which cable 72 is connected by means of a turnbuckle 84. The clamping mechanism 30 is actuated by pivoting the handle 86 of toggle lock 82 upwardly to a locked position indicated in dotted lines as at 86a in FIG. 6.

The operation of clamping device 30 will now be described with particular reference to FIGS. 2–4. FIG. 2 shows the clamping device in an open position immediately following insertion of the load engaging forks 22a and 22b beneath the upper load bearing surface 26a of pallet 24. At this point, operating handle 86 is down in the unlocked position. Carriage plate 44 is held in a forward position by the compressive force of springs 46 and the gripping members 50 are held open by the compressive force of spring 69. The gripping members 50 are suitably shaped to receive and guide center stringer 28b with the result that the pallet is centered on the load engaging forks. Following positioning of the load engaging forks beneath the pallet, the operator next elevates carriage assembly 16 slightly so as to provide some clearance between the pallet and the floor. Handle 86 is then pivoted upwardly to exert a pulling force on cable 72. This initially causes gripping members 50a and 50b to pivot about pins 52 to the closed position shown in FIG. 3. The compressive force of spring 69 is less than that of springs 46, thus allowing this initial step to be accomplished without moving carriage plate 44. When the jaw sections 54 of the gripping members are closed, their serrated surfaces 60 grip the sides of the center pallet stringer 28b.

With the center pallet stringer 28b now firmly gripped between the jaw sections 54, continued upward pivotal movement of handle 86 next results in the carriage plate 44 being moved towards back panel 20 against the compressive force of springs 46. This in turn results in the pallet 24 being pulled along the upper surfaces of the load engaging forks 26a and 26b into a position abutting a bearing member 88 (see FIGS. 5 and 7), the latter being fixed to the forward edge of platform 18 by any convenient means such as for example welding or the bolts 90 depicted in the drawings. Bearing member 88 is preferably provided with a vertically inclined front face 92. As can be best seen in FIG. 7, the horizontal pulling force $F_h$ being exerted on the pallet in a direction parallel to the length of the load forks causes the pallet to pivot about its upper edge 94 in a downward clockwise direction. This pivotal force pushes the pallet down onto the upper surfaces of the forks 22a and thus eliminates any tendency of the pallet to subsequently tip or shift vertically.

In view of the above, it can therefore be seen that when handle 86 is finally moved to its upper locked position 86a the pallet is firmly and securely held against both vertical and lateral shifting in a position abutting the inclined face 92 of bearing member 88.

It should now be apparent that minor modifications and alterations can be made to the embodiment herein chosen for purposes of disclosure without departing from the scope of the present invention. For example, the invention might be employed with any load supporting platform or vehicle being lifted by the load forks by simply making minor adjustments and/or alterations to the design and location of the gripping members 50a and 50b. One such modification might include arranging the gripping members to engage a portion of a pallet or platform other than the center stringer as herein illustrated. Also, the gripping members might be designed to engage a pin or the like on the load supporting platform.

It is our intention to cover these and any other modifications to the embodiment herein chosen for purposes of disclosure which do not depart from the spirit and scope of the invention.

We claim:
1. For use with a material handling truck having outwardly extending load forks adapted for carrying a load supporting platform, a device for fixing said platform on said forks comprising: clamping members positioned to center and grip said platform when the load forks are inserted therebeneath; a bearing surface on said truck fixed relative to said clamping members; and means for closing said members to grip said platform, the said means being operative thereafter to move said closed members relative to said load forks so as to draw the platform into a fixed position abutting said bearing surface.

2. The apparatus as claimed in claim 1 further characterized by said bearing surface being inclined vertically in relation to the upper surfaces of said load forks, the angle of inclination being such as to cause a platform abutting said bearing surface to be forced downwardly onto said forks.

3. The apparatus as claimed in claim 2 further characterized by said clamping members being pivotally mounted on a carriage assembly, the said carriage assembly being movable relative to said bearing surface in a direction parallel to the length of said forks.

4. The apparatus as claimed in claim 3 further characterized by each said clamping members having an angularly disposed lever arm, the lever arms of both said clamping members being pivotally interconnected.

5. The apparatus as claimed in claim 4 further characterized by said operating means being connected to said clamping members at the point of pivotal connection between said lever arms.

6. The apparatus as claimed in claim 5 further characterized by first spring means acting on said lever arms to urge said clamping members to open position.

7. The apparatus as claimed in claim 6 further characterized by second spring means urging said carriage assembly towards said platform, the compressive force of said second spring means being greater than that of said first spring means.

8. For use with a material handling truck having spaced load forks adapted for insertion beneath a pallet, the pallet being of the type having an underlying central support member, a clamping device for fixing said pallet on said forks comprising: a bearing surface on said truck extending in a direction transverse to the length of said forks; a carriage assembly mounted on said truck for movement in a direction parallel to the length of said forks; spaced clamping jaws between said load forks, the said clamping jaws being pivotally mounted on said carriage assembly; spring means for urging said jaws to an open position, the said jaws when open being positioned to axially receive said central support member therebetween when the load forks are inserted beneath said pallet; and operating means for initially closing said jaws to exert a clamping action on said support member and for thereafter moving said carriage assembly relative to said forks, thus drawing said pallet into a fixed position abutting said bearing surface.

9. For use with a material handling truck having spaced load forks adapted for insertion beneath a pallet of the type having an underlying support member, a pallet clamping device comprising: clamping jaws positioned between said load forks to axially receive said support member when the load forks are inserted beneath said pallet; a bearing surface on said truck fixed relative to said clamping jaws; and operating means for initially closing said jaws to grip said support member, the said means being operative thereafter to move said jaws toward said bearing surface, thus drawing the pallet into a fixed position abutting said bearing surface.

10. The apparatus as claimed in claim 9 further characterized by said bearing surface being inclined vertically in relation to the upper surfaces of said load forks, the angle of inclination being such as to cause a pallet abutting said bearing surface to be forced downwardly onto said forks.

11. For use with a material handling truck having spaced load forks adapted for insertion beneath a pallet of the type having an underlying support member, a pallet clamping device comprising: a bearing surface on said truck adjacent to said forks; clamping jaws extending beyond said bearing surface into the space between said forks, the said jaws being positioned to axially receive said support member when the lift load forks are inserted beneath said pallet; and operating means for initially closing said jaws to grip said support member, the said means being operative thereafter to move said jaws towards said bearing surface, thus drawing the pallet into a fixed position abutting said bearing surface.

References Cited

UNITED STATES PATENTS

| | | | |
|---|---|---|---|
| 2,639,051 | 5/1953 | Thomas | 214—514 |
| 2,665,020 | 1/1954 | Whittle | 214—517 |
| 2,832,487 | 4/1958 | Oster | 214—514 |

GERALD M. FORLENZA, Primary Examiner

GEORGE F. ABRAHAM, Assistant Examiner

U.S. Cl. X.R.

214—517; 294—115